(12) United States Patent
Zhou et al.

(10) Patent No.: US 12,462,603 B2
(45) Date of Patent: Nov. 4, 2025

(54) FACE DETECTION DEVICE, METHOD AND FACE UNLOCK SYSTEM

(71) Applicant: GUANGDONG OPPO MOBILE TELECOMMUNICATIONS CORP., LTD., Guangdong (CN)

(72) Inventors: Yang Zhou, Palo Alto, CA (US); Jie Liu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 640 days.

(21) Appl. No.: 17/748,813

(22) Filed: May 19, 2022

(65) Prior Publication Data

US 2022/0351491 A1    Nov. 3, 2022

Related U.S. Application Data

(63) Continuation of application No. PCT/CN2020/130219, filed on Nov. 19, 2020.

(Continued)

(51) Int. Cl.
*G06V 40/16* (2022.01)
*G06F 21/32* (2013.01)
(Continued)

(52) U.S. Cl.
CPC .......... *G06V 40/172* (2022.01); *G06F 21/32* (2013.01); *G06V 10/454* (2022.01);
(Continued)

(58) Field of Classification Search
CPC .......... G06F 21/32; G06N 3/045; G06N 3/08; G06V 10/454; G06V 10/7715;
(Continued)

(56) References Cited

U.S. PATENT DOCUMENTS

2010/0329565 A1    12/2010   Kunieda
2018/0068198 A1    3/2018    Savvides et al.
(Continued)

FOREIGN PATENT DOCUMENTS

CN     106599797    4/2017
CN     107209864    9/2017
(Continued)

OTHER PUBLICATIONS

Oh et al. "Counting and Segmenting Sorghum Heads" (Year: 2019).*

(Continued)

*Primary Examiner* — Kenny A Cese
(74) *Attorney, Agent, or Firm* — Hodgson Russ LLP

(57) ABSTRACT

A face detection device based on a convolutional neural network is provided. The device includes a feature extractor assembly and a detector assembly. The feature extractor assembly includes a first feature extractor, a second feature extractor and a third feature extractor. The first feature extractor is used to apply a first set of convolution kernels on an input grayscale image thereby generate a set of basic feature maps. The second feature extractor is used to apply a second set of convolution kernels on the set of basic feature maps and thereby generate more than one set of intermediate feature maps, which are concatenated. The third feature extractor is used to perform at least one convolution operation on a concatenated layer. The detector assembly includes at least one detector whose input is derived from one of the second feature extractor and the third feature extractor.

20 Claims, 4 Drawing Sheets

Related U.S. Application Data

(60) Provisional application No. 62/938,205, filed on Nov. 20, 2019.

(51) Int. Cl.
  *G06V 10/44* (2022.01)
  *G06V 10/77* (2022.01)
  *G06V 10/80* (2022.01)
  *G06V 10/82* (2022.01)

(52) U.S. Cl.
  CPC ........ *G06V 10/7715* (2022.01); *G06V 10/806* (2022.01); *G06V 10/82* (2022.01); *G06V 40/161* (2022.01); *G06V 40/162* (2022.01); *G06V 40/168* (2022.01)

(58) Field of Classification Search
  CPC .... G06V 10/806; G06V 10/82; G06V 40/161; G06V 40/162; G06V 40/168; G06V 40/172
  USPC .......................................................... 382/158
  See application file for complete search history.

(56) References Cited

U.S. PATENT DOCUMENTS

| | | | | |
|---|---|---|---|---|
| 2018/0211099 | A1* | 7/2018 | Ranjan | G06V 40/171 |
| 2018/0373924 | A1* | 12/2018 | Yoo | G06V 10/454 |
| 2019/0102646 | A1* | 4/2019 | Redmon | G06V 20/20 |
| 2019/0130223 | A1* | 5/2019 | Anderson | G06N 3/045 |
| 2019/0205643 | A1* | 7/2019 | Liu | G06N 3/045 |
| 2019/0286153 | A1* | 9/2019 | Rankawat | G05D 1/0246 |
| 2019/0384304 | A1* | 12/2019 | Towal | G06T 7/60 |
| 2020/0090028 | A1* | 3/2020 | Huang | G06V 30/19173 |
| 2020/0279393 | A1* | 9/2020 | Wolf | G06T 3/4046 |
| 2020/0301013 | A1* | 9/2020 | Banerjee | G01S 17/931 |
| 2020/0395117 | A1* | 12/2020 | Schnorr | G06N 3/088 |
| 2021/0019541 | A1* | 1/2021 | Wang | G06V 40/172 |

FOREIGN PATENT DOCUMENTS

| | | |
|---|---|---|
| CN | 107403141 | 11/2017 |
| CN | 108765279 | 11/2018 |
| CN | 109919013 | 6/2019 |
| CN | 110097673 | 8/2019 |
| WO | 2018120013 | 7/2018 |

OTHER PUBLICATIONS

EPO, Communication for EP Application No. 20890449.0, Nov. 22, 2024.
CNIPA, First Office Action for CN Application No. 202080079565.7, Sep. 6, 2024.
EPO, Extended European Search Report for EP Application No. 20890449.0, Nov. 28, 2022.
Simonyan et al., "Very deep convolutional networks for large-scale image recognition," International Conference on Learning Representations, 2015.
Redmon et al., "You only look once: Unified, real-time object detection," arXiv:1506.02640, 2015.
Tang et al., "PyramidBox: A context-assisted single shot face detector," Proceedings of European Conference on Computer Vision (ECCV), 2018.
Najibi et al., "SSH: Single stage headless face detector," Proceedings of the International Conference on Computer Vision (ICCV), 2017.
Zhang et al., "Joint face detection and alignment using multi-task cascaded convolutional networks," IEEE Signal Processing Letters, 2016, vol. 23, No. 10.
WIPO, International Search Report and Written Opinion for PCT/CN2020/130219, Feb. 10, 2021.
CNIPA, Second Office Action for CN Application No. 202080079565.7, Mar. 28, 2025.
CNIPA, Decision of Rejection for CN Application No. 202080079565.7, Jul. 4, 2025.

* cited by examiner

FACE DETECTION DEVICE, METHOD AND FACE UNLOCK SYSTEM

CROSS REFERENCE TO RELATED APPLICATIONS

This application is a continuation of International Application No. PCT/CN2020/130219, filed Nov. 19, 2020, which claims priority to U.S. Provisional Application No. 62/938,205, filed Nov. 20, 2019, the entire disclosures of which are incorporated herein by reference.

TECHNICAL FIELD

The present disclosure relates to the field of computer vision technologies, and more particularly, to a face detection device, a face detection method and a face unlock system.

BACKGROUND

Face detection has been one of the most important topics in computer vision research, it plays an important role in many daily applications such as face unlock, video surveillance, and the like.

Most current researches are focused on wild outdoor environment, wherein the faces typically have various scales, and extreme tiny faces are hard to be detected; and the research are mostly involved in improving the face detection accuracy, with the increase of expensive computational cost. However, both of the above scenarios are indeed not the concern for face unlock. Reasons are as follows: 1) the face scale is different from that under the face unlock; 2) the face unlock is deployed on the mobile device, that the computational power is quite constrained.

SUMMARY

The disclosure provides a face detection device, a face detection method and a face unlock system.

Embodiments of the disclosure provide a face detection device based on a convolutional neural network. The device includes a feature extractor assembly and a detector assembly. The frontend feature extractor assembly includes a first feature extractor, a second feature extractor and a third feature extractor. The first feature extractor is configured to apply a first set of convolution kernels on an input grayscale image thereby generate a set of basic feature maps. The second feature extractor is configured (i.e., structured and arranged) to apply a second set of convolution kernels whose size is smaller than that of the first set of convolution kernels, on the set of basic feature maps and thereby generating a more than one set of intermediate feature maps. The third feature extractor is configured to perform at least one convolution operation on the more than one set of intermediate feature maps. The backend detector assembly includes at least one detector whose input is derived from one of the second feature extractor and the third feature extractor.

Embodiments of the disclosure provide a face detection method based on a convolutional neural network. The method includes: applying a first set of convolution kernels on an input grayscale image thereby generating a set of basic feature maps; applying a second set of convolution kernels whose size is smaller than that of the first set of convolution kernels, on the set of basic feature maps and thereby generating more than one set of intermediate feature maps; performing at least one convolution operation on the more than one set of intermediate feature maps thereby generating a set of deep feature maps; and determining a bounding box classification and a bounding box regression, based on one of the more than one set of intermediate feature maps and the set of deep feature maps.

Embodiments of the disclosure provide a face unlock system. The system includes: an IR camera, an image decoding device, a face detection device and a face verification device. The IR camera is configured to capture an image; the image decoding device is configured to decode the captured image to form a grayscale image; the face detection device is configured to generate a set of basic feature maps, more than one set of intermediate feature maps and a set of deep feature maps, and output a bounding box classification result and a bounding box regression result; and the face verification device is configured to determine whether the grayscale image corresponds to an authorized person for unlocking, based on the bounding box classification result and the bounding box regression result.

BRIEF DESCRIPTION OF THE DRAWINGS

In order to more clearly describe the technical solutions of the disclosure, the following briefly introduces the drawings needed to be used in the description of the embodiments. Obviously, the drawings in the following description only illustrate some embodiments of the disclosure, and other drawings can be obtained for those skilled in the art, based on these drawings without creative work.

DETAILED DESCRIPTION OF PREFERRED EMBODIMENTS

Figure 1:
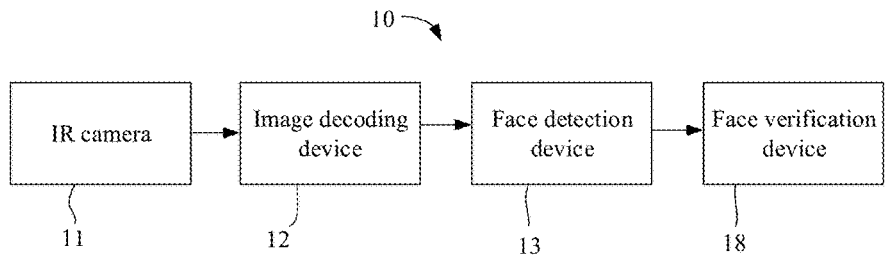
FIG. 1 illustrates a schematic block diagram of a face unlock system, according to an embodiment of the disclosure.

The same reference numeral in the drawings represent the same component, and the principle of the disclosure is illustrated by being implemented in an appropriate computing environment for illustration. The following description is based on the exemplified specific embodiments of the disclosure and should not be regarded as limiting other embodiments that are not illustrated herein.

The principle of the disclosure uses many other computation system, communication environments or configurations, with general purpose or specific purpose, to execute. Well-known examples of computing systems, environments, and configurations suitable for use in this disclosure may include (but are not limited to) handheld phones, personal computers, servers, multi-processor systems, microcomputer-based systems, main architecture computers, and distributed computing environments which include any of the above systems or devices.

Details will be described below.

FIG. 1 illustrates a schematic structural diagram of a face unlock system 10. The face unlock system 10 may include an IR camera 11, an image decoding device 12, a face detection device 13, and a face verification device 18.

The IR camera 11 adopts an IR sensor. The IR sensor includes two parts, an IR LED as an emitter and an IR photodiode as a receiver. The IR LED is a special purpose LED emitting infrared rays ranging from 700 nm to 1 mm wavelength. Different IR LEDs may produce infrared light of differing wavelengths. IR LED can be made of gallium arsenide or aluminium gallium arsenide. The IR photodiode is sensitive to the IR light emitted by the IR LED. The photodiode's resistance and output voltage change in proportion to the IR light received. This is the underlying working principle of the IR sensor. The type of incidence can be direct incidence or indirect incidence. In direct incidence, the IR LED is placed in front of a photodiode with no obstacle in between. In indirect incidence, both the diodes are placed side by side with an opaque object in front of the sensor. The light from the IR LED hits the opaque surface and reflects back to the photodiode.

The IR camera 11 is configured to capture images of objects, i.e., a human face. In the embodiment, the captured raw image may be in the size of 640×400, its width is 640 and its height is 400. The capture raw image may be 12-bit in depth.

When the IR LED is worked with IR structure light, the IR camera 11 may construct 3D images.

The IR camera 11 applies auto-focus technology, and can focus on the human face to capture a clear image of the human face.

The image decoding device 12 is configured to decode the captured raw image, in grayscale, to form a grayscale image. Each pixel of the grayscale image has a pixel value, which ranges from 0 to 255. That is, the decoded grayscale image can be represented as a matrix in the size of 640×400.

The image decoding device 12 may be implemented in the manner of software or hardware.

The image decoding device 12 is electrically connected between the IR camera 11 and the face detection device 13. The captured raw image, output from the IR camera, is input into the image decoding device 12. The decoded grayscale image, output from the image decoding device 12, can be input into the face detection device 13.

The face detection device 13 is configured to process the input grayscale image and output a detection result. The detection result includes a bounding box classification result and a bounding box regression result.

The bounding box classification result refers to a face classification result, it includes two dimensions, the first one represents a probability of being a face, the second one represents a probability of not a face.

The bounding box regression result refers to a bounding box location result, it includes four dimensions, the first one represents an offset of x-coordinate at the upper left corner of a bounding box, the second one represents an offset of y-coordinate at the upper left corner of the bounding box, the third one represents an offset of x-coordinate at the lower right corner of the bounding box, and the fourth one represents an offset of y-coordinate at the lower right corner of the bounding box.

Based on the detection result, it can predict whether the input image includes a human face and where the human face locates. The detection result can be input into the face verification device 18, and the face verification device 18 is configured to determine whether it is corresponding to an authorized person for unlocking.

That is, the face verification device 18 may acquire sample face images of the authorized person, generate a verification pair including the human face predicted by the face detection device 13 and the sample face of the authorized person, and determine whether it is a positive pair, wherein the positive pair may correspond to an unlocking instruction. When the human face predicted by the face detection device 13 and the sample face are determined belong to the same person, the verification pair is regarded to be positive. When the human face predicted by the face detection device 13 and the sample face are determined not belong to the same person, the verification pair is regarded to be negative. The positive pair may generate the unlocking instruction, to instruct to unlock an electronic device. Meanwhile, the negative pair may fail to generate the unlocking instruction, and the electronic device may remain locked.

The face verification device 18 may further connected with a security component of the electronic device, and the security component may receive the unlocking instruction to unlock the electronic device.

The face verification device 18 may include a comparing processor and a memory, the comparing processor is configured to perform the verification processes, and the memory is configured to store the sample face images. It can be understood that, the comparing processor and the memory can also be external devices, just are signally connected with the face verification device 18.

Figure 2:
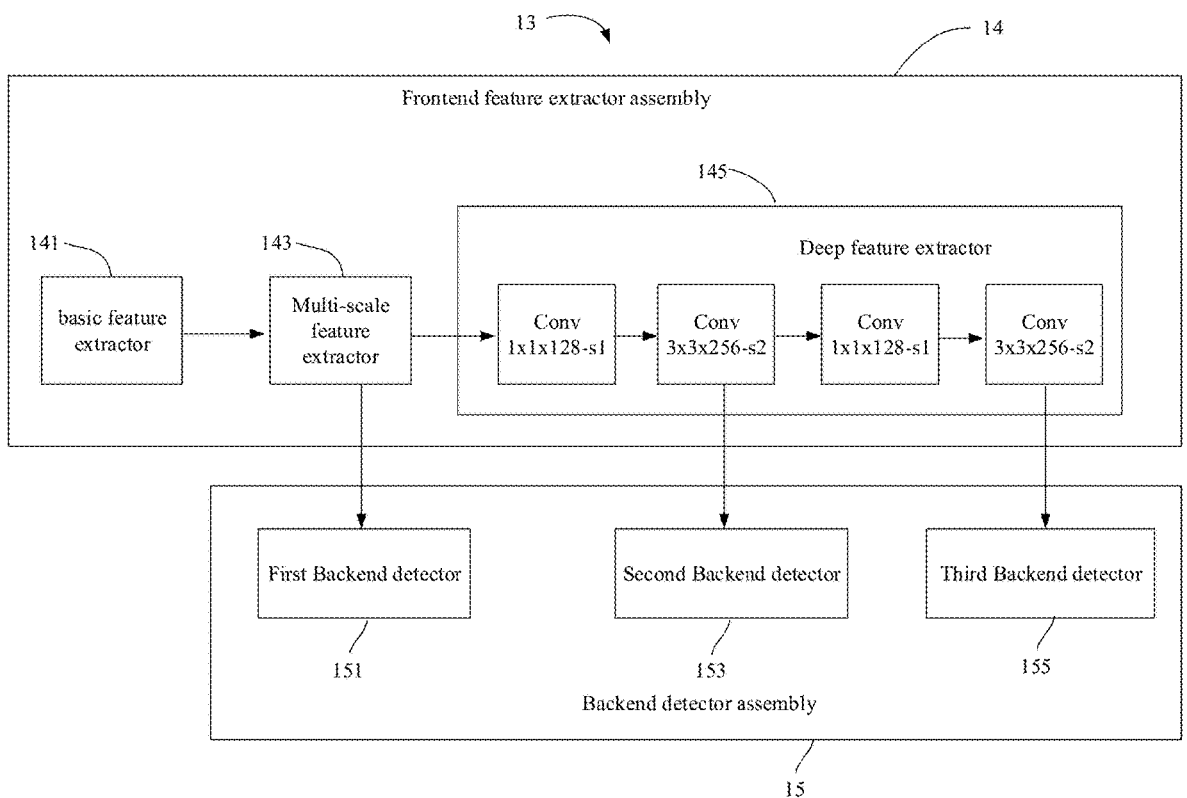
FIG. 2 illustrates a schematic diagram of a face detection device, according to an embodiment of the disclosure.

FIG. 2 illustrates a schematic block diagram of the face detection device 13. The face detection device 13 includes a frontend feature extractor assembly (also referred to as feature extractor assembly) 14 and a backend detector assembly (also referred to as detector assembly) 15.

Figure 3:
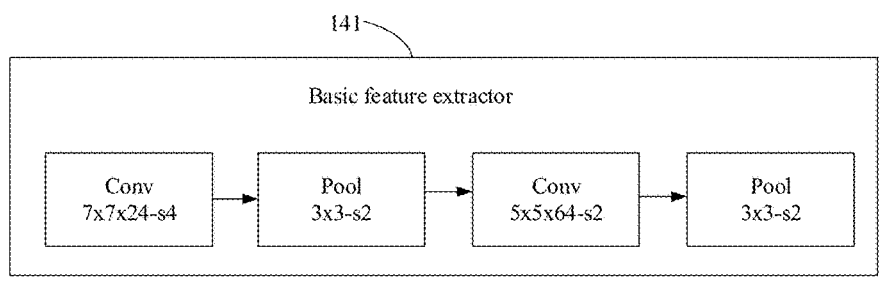
FIG. 3 illustrates a schematic diagram of a basic feature extractor, according to an embodiment of the disclosure.

The frontend feature extractor assembly 14 includes a basic feature extractor (also referred to as first feature extractor) 141, a multi-scale feature extractor (also referred to as second feature extractor) 143, and a deep feature extractor (also referred to as third feature extractor) 145, as illustrated in FIG. 3.

The basic feature extractor 141 is configured to extract basic features of the input grayscale image. The basic feature extractor 141 applies at least one convolution operations and at least one pooling operations on the input grayscale image.

Specifically, the basic feature extractor 141 sequentially performs a first operation, a second operation, a third operation, and a fourth operation on the input grayscale image.

The first operation is a convolution operation, a number of convolution kernels are applied to the input grayscale image, with a relatively large kernel size N×N and a particular stride L, thereby generating a first set of feature maps, i.e., convolutional layers. The number of the convolution kernels is represented as M, M is equal to the number of the feature maps in the first set. In other words, the number of the convolution kernels M defines the number of output channels of the first operation. The first set of feature maps each has a size smaller than the input grayscale image, the size of the feature map in the first set is determined by the kernel size, the stride, and a corresponding padding value in the first operation.

For example, N=7, L=4, M=24. There are 24 convolution kernels, with a kernel size 7×7 and a stride of 4, applied to the input grayscale image, thereby generating 24 convolutional layers constituting the first set of feature maps. That is, the number of output channels of the first operation is 24. Each of the first set of feature maps may have a size of 149×99, assuming the padding value is 0, in other words, no padding. It should be noted that, when the calculated size of the feature map is not an integer, the calculated size may be rounded down in the convolution operation. In other embodiments, a padding operation can be performed on the input grayscale to generate integer size feature maps, the padding value may be preset as required. In that situation the size of the first set of feature maps may be other values.

It can be understood that, convolution kernels with different size and different strides can be applied to the input grayscale image, which is not limited in the disclosure.

After the first operation, the second operation is performed on the first set of feature maps. The second operation is a pooling operation, to reduce the size of the feature maps and the amount of computation. A pooling filter, with a particular size C×C and a particular stride 0, is applied to the first set of feature maps, to generate a second set of feature maps, i.e., a number of pooling layers. The number of the feature maps in the second set is equal to that in the first set. The second set of feature maps each has a size smaller than that of the first set of feature maps, the size of the feature map in the second set is determined by the pooling filter size, the stride and a corresponding padding value in the second operation.

For example, C=3, O=2. The pooling filter, with a size 3×3 and a stride of 2, is applied to the first set of feature maps, thereby generating 24 pooling layers constituting the second set of feature maps. Each of the second set of feature maps may have a size of 74×49, assuming the padding value is 0. It should be noted that, when the calculated size of the feature map is not an integer, the calculated size may be rounded up in the pooling operation. In other embodiments, other manners may be adopted to generate integer size feature maps.

The pooling operation may be a max pooling operation or a mean pooling operation, the max pooling operation extracts the max value corresponding to the pooling filter while the mean pooling operation extracts the average value corresponding to the pooling filter.

After the second operation, the third operation is performed on the second set of feature maps. The third operation also is a convolution operation. a number of convolution kernels are applied to the input second set of feature maps, with a relatively large kernel size P×P and a particular stride O, thereby generating a third set of feature maps, i.e., convolutional layers. The number of the convolution kernels applied in this operation is represented as Q, and Q is equal to the number of output channels in this operation. The third set of feature maps each has a size smaller than the second set of feature maps, the size of the feature map in the third set is determined by the kernel size and the stride in the third operation.

For example, P=5, Q=64. There are 64 convolution kernels, with a kernel size 5×5 and a stride of 2, applied to the second set of feature maps, thereby generating 64 convolutional layers constituting the third set of feature maps. Each of the third set of feature maps may have a size of 36×24 when assuming the padding value is 1 in the third operation. It should be noted that, the padding value is not limited and can be determined as actual needs. In addition, convolution kernels with different size and different stride can be applied to the third set of feature maps, and the number of the output channels in the third operation is also not limited in the disclosure.

After the third operation, the fourth operation is performed on the third set of feature maps. The fourth operation is a pooling operation. A pooling filter, with a particular size C×C and a particular stride O, is applied to the third set of feature maps, to generate a fourth set of feature maps, i.e., a number of pooling layers.

The number of the feature maps in the fourth set is equal to that in the third set. The fourth set of feature maps each has a size smaller than that of the third set of feature maps, the size of the feature map in the fourth set is determined by the pooling filter size and the stride in the fourth operation.

For example, the pooling filter, with a size 3×3 and a stride of 2, is applied to the third set of feature maps, thereby generating 64 pooling layers constituting the fourth set of feature maps. Each of the fourth set of feature maps may have a size of 18×12. It should be noted that, when the calculated size of the feature map is not an integer, the calculated size may be rounded up in the pooling operation. In other embodiments, other manners may be adopted to generate integer size feature maps.

The pooling operation may be a max pooling operation or a mean pooling operation.

It is noted that the convolution kernels applied in the basic feature extractor 141 have relatively large size. Further, the convolution kernels applied in the first operation has a size larger than that applied in the third operation. The pooling filter applied in the second operation has a size the same as that applied in the fourth operation. However, the sizes of the convolution kernels are greater than that of the pooling filters.

In the basic feature extractor 141, the input image is quickly down-sampled, for the purpose of reducing computational cost.

For example, based on the above listed stride of the convolution kernels and the pooling filters applied in the above four operations, the down-sampling stride can be determined as 32. As such, the computational cost is effectively reduced.

The basic feature extractor 141 extracts the input grayscale image and outputs the fourth set of feature maps, and the fourth set of feature maps is input into the multi-scale feature extractor 143.

Figure 4:
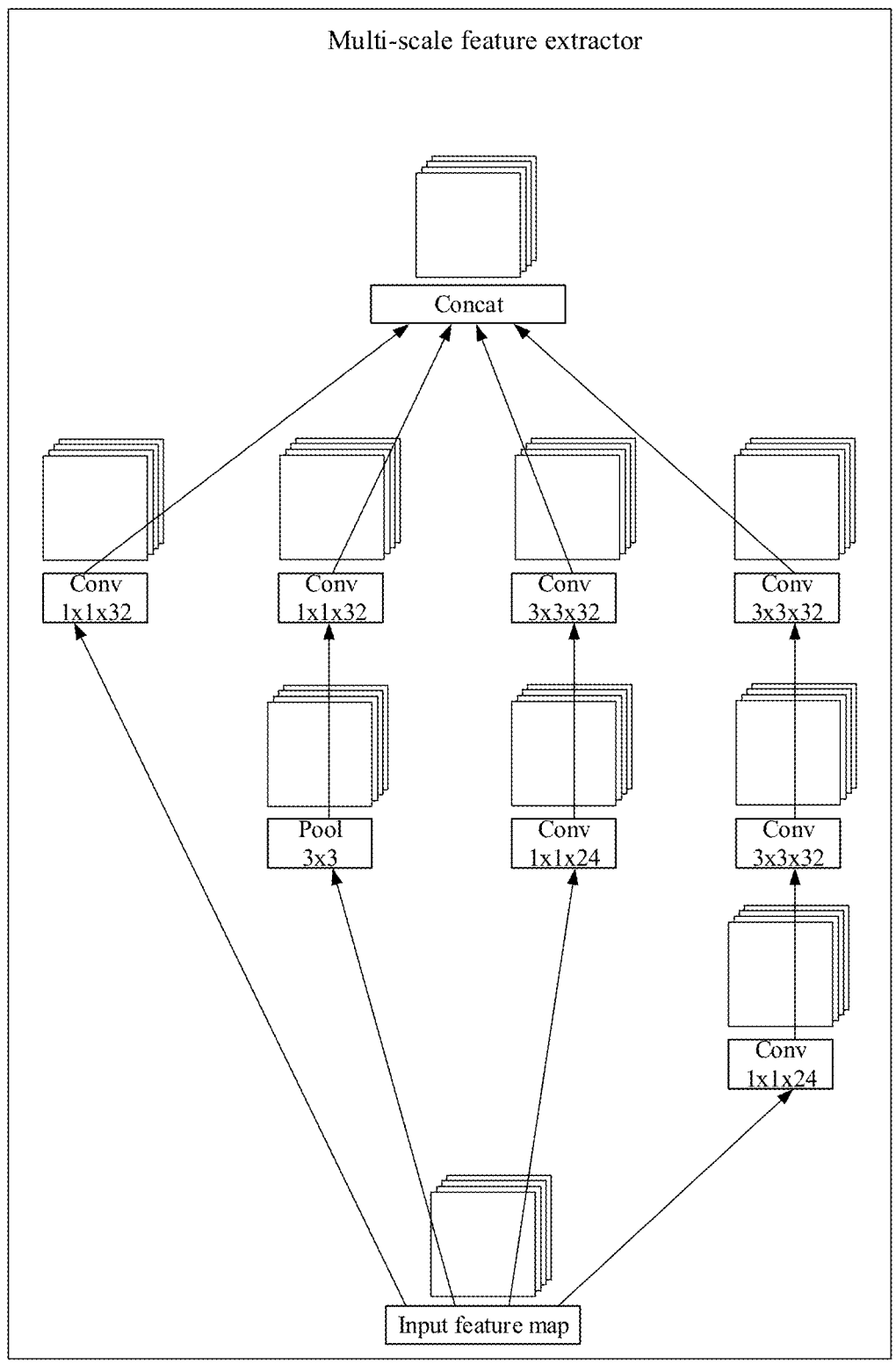
FIG. 4 illustrates a schematic diagram showing processing paths of a multi-scale feature extractor, according to an embodiment of the disclosure.

FIG. 4 illustrates a schematic structural diagram of the multi-scale feature extractor 143, according to an embodiment of the disclosure.

The multi-scale feature extractor 143 is configured to perform a plurality of convolution operations, with various convolution kernel sizes, on the input image or the input feature map from the previous layer, thereby to obtain various convoluted feature maps. The multi-scale feature extractor 143 is further configured to perform a concatenating operation on the various convoluted feature maps from every processing path, thereby to generate and output an aggregated feature map.

In the embodiment, the multi-scale feature extractor 143 defines several processing paths to perform different operations on the input image or the input feature map from the previous layer. Each processing path includes at least one convolution operation.

In one embodiment, the input image or the input feature map from the previous layer can be processed in every processing path. The number of output channels of each processing path is the same. That is, the processing paths output different convoluted feature maps with the same number of channels, therefore, theses output feature maps can be concatenated to form a concatenated layer in further.

In other embodiments, the input image or the input feature map from the previous layer can be selectively processed in at least one of the processing paths, and output the convoluted feature maps generated from the processing path. The selection of the processing path can be designated by a processor, or can be an autonomous selection of the CNN.

Sizes of convolution kernels applied in the multi-scale feature extractor 143 are smaller than that applied in the basic feature extractor 141.

For example, the multi-scale feature extractor 143 defines four processing paths.

The first processing path only includes one convolution operation. The first processing path uses a number of 1×1 convolution kernels to limit (reduce or increase) the number of output channels. The number of the 1×1 convolution kernels in the first processing path is represented as an integer A, the number of channels of the input feature maps is represented as an integer B; if A is greater than B, the number of channels is increased after the convolution operation; and if A is less than B, the number of channels is reduced after the convolution operation.

The convolution kernels, with the size of 1×1, are applied to the input fourth set of feature maps to generate a fifth set of feature maps. The fifth set of feature maps has A output channels. For example, A=32, the fifth set of feature maps is constituted by 32 convolution layers.

The second processing path sequentially includes a pooling operation and a convolution operation. A pooling filter, with a size of C×C, is applied to the input fourth set of feature maps to generate a sixth set of feature maps; and then a number of convolution kernels, with a size of 1×1 and the number of A, are applied to the sixth set of feature maps to generate a seventh set of feature maps constituted by A convolution layers. C is an integer greater than 1, e.g., C=3.

The third processing path includes two convolution operations. A plurality of convolution kernels, with a size of 1×1 and a number of D, are applied to the input fourth set of feature maps to generate an eighth set of feature maps constituted by D convolution layers; and then a plurality of convolution kernels, with a size of C×C and a number of A, are applied to the eighth set of feature maps to generate a ninth set of feature maps constituted by A convolution layers. The integer D may be less than the integer A. D is an integer smaller than A, e.g., D=24.

The fourth processing path includes three convolution operations. A plurality of convolution kernels, with a size of 1×1 and a number of D, are applied to the input fourth set of feature maps to generate a tenth set of feature maps constituted by D convolution layers; and a plurality of convolution kernels, with a size of C×C and a number of A, are applied to the tenth set of feature maps to generate a eleventh set of feature maps constituted by A convolution layers; then a plurality of convolution kernels, with a size of C×C and a number of A, are applied to the eleventh set of feature maps to generate a twelfth set of feature maps constituted by A convolution layers.

The fifth set of feature maps, the seventh set of feature maps, the ninth set of feature maps, and the twelfth set of feature maps are fused to thereby be integrated as one aggregated feature map. A concatenating operation can be applied on the fifth set of feature maps, the seventh set of feature maps, the ninth set of feature maps, and the twelfth set of feature maps, and theses sets of feature maps are fused to generate a concatenation layer as the aggregated feature map, which is output by the multi-scale feature extractor 143.

In other embodiments, the concatenation operation can be replaced by an adding operation.

The multi-scale feature extractor 143 can also be considered as includes a first sub-extractor, a second sub-extractor, a third sub-extractor, and a feature fusion component. Details of the first sub-extractor, the second sub-extractor, the third sub-extractor, and the feature fusion component can be referred to the operations described above, and are not repeated here again.

The operations in the multi-scale feature extractor 143 are not limited, other processing paths can also be defined in the multi-scale feature extractor 143, and every processing path can also define other operations therein. It should be noted that various sized convolution kernels (or filters) are applied in the multi-scale feature extractor 143, for the purpose of improving the detection accuracy.

Figure 5:
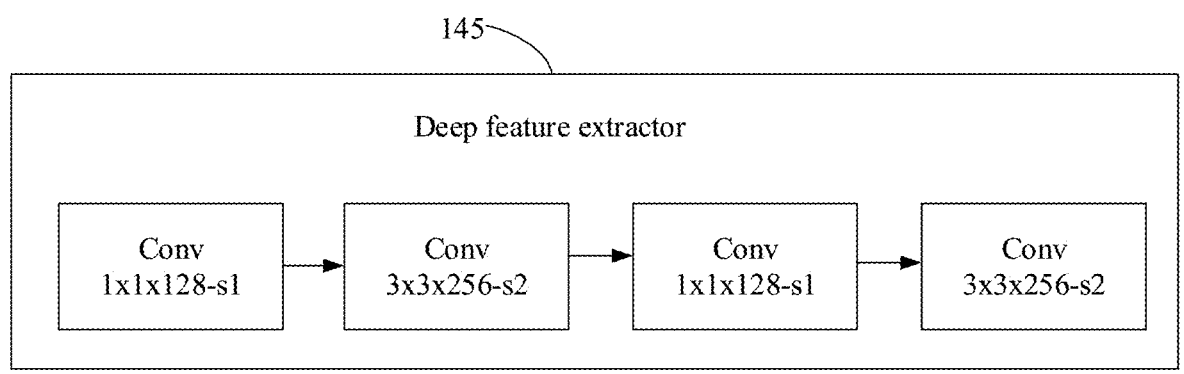
FIG. 5 illustrates a schematic diagram of a deep feature extractor, according to an embodiment of the disclosure.

The deep feature extractor 145 is configured to perform at least one convolution operation on the aggregated feature map, which is output form the multi-scale feature extractor 143. In other words, the deep feature extractor 145 applies at least one convolution operation on the aggregated feature map. Specifically, the deep feature extractor 145 sequentially performs four convolution operations, i.e., a thirteenth operation, a fourteenth operation, a fifteenth operation, and a sixteenth operation on the aggregated feature map, as illustrated in FIG. 5.

The thirteenth operation applies a plurality of convolution kernels, with a size of 1×1 and a number of E, to the aggregated feature map, thereby generating a thirteenth set of feature maps constituted by E convolution layers. The fourteenth operation applies a plurality of convolution kernels, with a size of C×C and a number of F, to the thirteenth set of feature maps, thereby generating a fourteenth set of feature maps constituted by F convolution layers. E and F can be set as actual requirements, in some embodiments, F=2E. For example, E=128, F=256. The fifteenth operation applies a plurality of convolution kernels, with a size of 1×1 and a number of E, to the fourteenth set of feature maps, thereby generating a fifteenth set of feature maps constituted by E convolution layers. The sixteenth operation applies a plurality of convolution kernels, with a size of C×C and a number of F, to the fifteenth set of feature maps, thereby generating a sixteenth set of feature maps constituted by F convolution layers.

Sizes of convolution kernels applied in the deep feature extractor 145 are smaller than that applied in the basic feature extractor 141.

It can be understood that, the deep feature extractor 145 can also perform other operations on the aggregated feature map, which is output form the multi-scale feature extractor 143.

The backend detector assembly 15 includes at least one detector, whose input is derived from the multi-scale feature extractor 143 or the deep feature extractor 145.

In the embodiment, more than one detectors are individually applied on more than one different scaled feature maps, to better detect different scaled human faces, thereby improving the detection accuracy.

The number of detectors may be three. That is, the backend detector assembly 15 includes a first backend detector (also referred to as first detector) 151, a second backend detector 153 (also referred to as second detector), and a third backend detector (also referred to as third detector) 155. The first backend detector assembly 151 is connected with the multi-scale feature extractor 143 in data, in other words, the input of the first backend detector 151 is derived from the multi-scale feature extractor 143. The second backend detector assembly 153 and the third backend detector 155 both are connected with the deep feature extractor 145 in data, in other words, the input of the second backend detector 153 is derived from the deep feature extractor 145, and the input of the third backend detector 155 is derived from the deep feature extractor 145. It is noted that the input of the second backend detector 153 and the third backend detector 155 is derived from different operations in the deep feature extractor 145.

Figure 6:
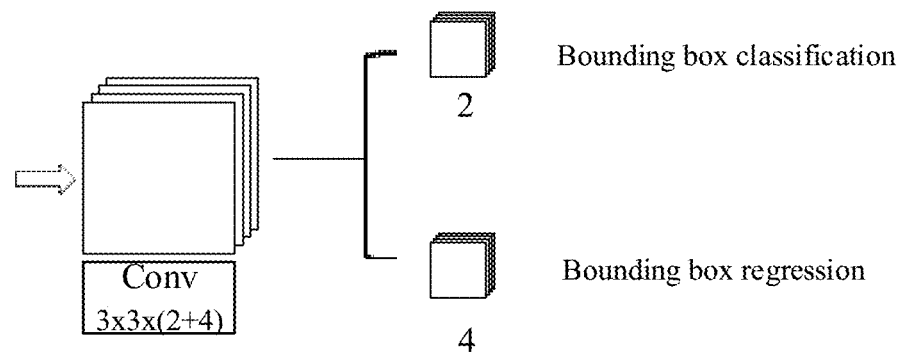
FIG. 6 illustrates a schematic diagram of a backend detector, according to an embodiment of the disclosure.

In one embodiment, the input of the first backend detector 151 can be derived from the output of the concatenating operation of the multi-scale feature extractor 143. In another embodiment, the input of the first backend detector 151 can also be derived from the last convolution operation of the fourth processing path. In other embodiments, the input of the first backend detector 151 can also be derived from any other convolution operation of any processing path. For example, the aggregated feature map, output from the multi-scale feature extractor 143, can be input into the first backend detector 151. As illustrated in FIG. 6, convolution filters, with a size of C×C and respective numbers of 2 and 4, are applied to the input feature map, and output a first bounding box classification result with 2 values (i.e., channels) and a first bounding box regression result with 4 values. The first value of the first bounding box classification result represents a probability of being a human face, the second value of the first bounding box classification result represents a probability of not a human face. In the first bounding box regression result, the first value represents an offset of x-coordinate at the upper left corner of a bounding box, the second value represents an offset of y-coordinate at the upper left corner of the bounding box, the third value represents an offset of x-coordinate at the lower right corner of the bounding box, and the fourth value represents an offset of y-coordinate at the lower right corner of the bounding box.

The input of the second backend detector 153 can be derived from the output of the fourteenth operation of the deep feature extractor 145. In other embodiments, the input of the second backend detector 153 can also be derived from another operation of the deep feature detector 155. Convolution filters, with a size of C×C and respective numbers of 2 and 4, are applied to the input feature map (i.e., the fourteenth set of feature maps), and output a second face classification result with 2 values (i.e., channels) and a second bounding box location result with 4 values.

The input of the third backend detector 155 can be derived from the output of the sixteenth operation of the deep feature extractor 145. In other embodiments, the input of the third backend detector 155 can also be derived from another operation of the deep feature detector 155. Convolution filters, with a size of C×C and respective numbers of 2 and 4, are applied to the input feature map (i.e., the sixteenth set of feature maps), and output a third face classification result with 2 values (i.e., channels) and a third bounding box location result with 4 values.

C is an integer greater than 1, e.g., C=3.

Three detectors 151, 153 and 155 are individually applied on three different scaled feature maps, to better detect different scaled faces, thereby achieving the purpose of improving detection accuracy.

It can be understood that, an area ratio of the human face in the entire input grayscale image may be different. In some grayscale images, the human face may occupy a relatively large proportion in the entire grayscale image; and in some other grayscale images, the human face may occupy a relatively small proportion in the entire grayscale image. Facial features may be extracted and reflected in different convolution layers with different depths. Thus, at least one of the detectors 151, 153, and 155, is the most accurate one for the prediction. After training the CNN, the CNN can automatically determine which detector is the most accurate detector and use the determined detector for the prediction.

For example, when the area ratio of the human face to the entire input grayscale image is in a first range, the CNN automatically determine the first backend detector 151 is the most accurate detector for outputting the detection result. When the area ratio of the human face to the entire input grayscale image is in a second range, the CNN automatically determine the second backend detector 153 is the most accurate detector for outputting the detection result. When the area ratio of the human face to the entire input grayscale image is in a third range, the CNN automatically determine the third backend detector 155 is the most accurate detector for outputting the detection result. The first range is greater than the second range, the second range is greater than the third range. For example, the first range is 99%-70%, the second range is 69%-40%, and the third range is 39%-10%.

In another embodiment, the backend detector assembly 15 further includes a judge component, which is configured to judge which detection result is adopted and outputted, when one of the three detection results is different from another detection result.

In still another embodiment, the backend detector assembly 15 further includes a fusion component, which is configure to fuse the three detection results and output a fusion result, when one of the three detection results is different from another detection result. Specifically, each backend detector 151, 153 and 155 may correspond to an allocated weight, the weight can be allocated after training and according to respective prediction accuracy itself.

The assemblies and components of the face detection device 13 can be implemented by hardware or software, independently or integratedly. The implementation of the face detection device 13 is not limited.

The applicant evaluates the performance on an IR face dataset, which includes 1,763,000 IR face images. 35,500 images are used for training, and all the face images are used for evaluation. Currently, for the computational cost, the parameter size is 0.9 million, and the multiplier-addition count is 0.16 billion, which is estimated to be 10 ms running on snapdragon 845 using the HVX. For the missing detection rate, it is 0.06%, which is far lower than state-of-the-art SSH face detector, i.e., 1.87%.

Figure 7:
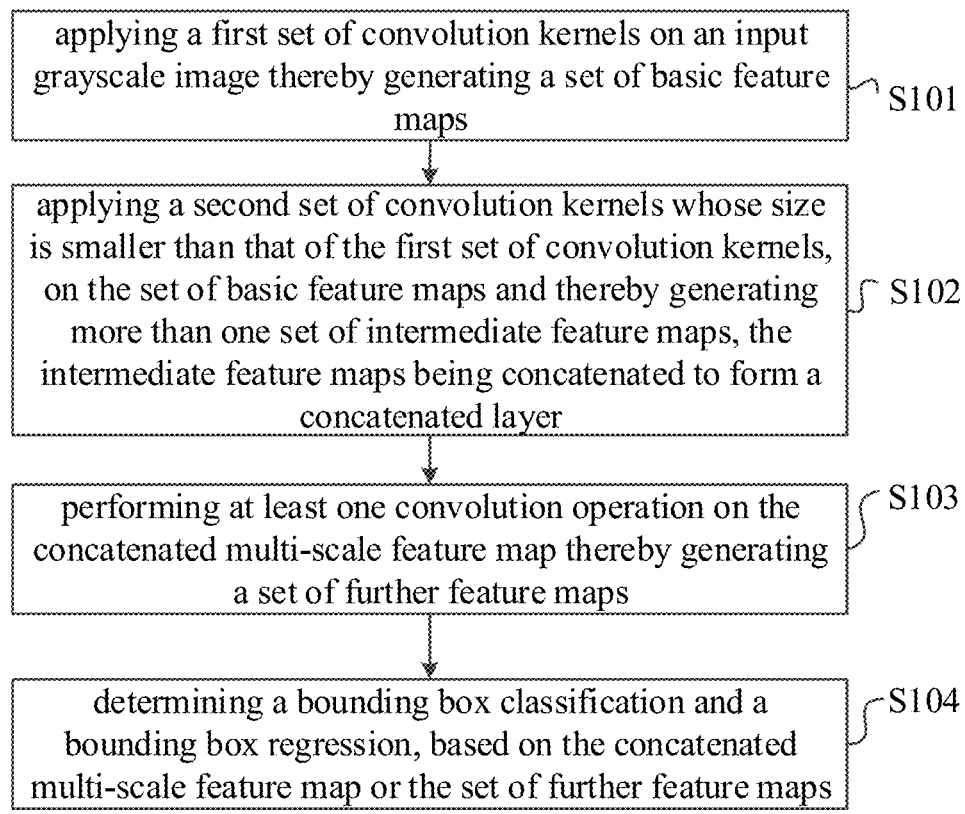
FIG. 7 illustrates a flow chart of a face detection method, according to an embodiment of the disclosure.

FIG. 7 illustrates a flow chart of a face detection method based on a convolutional neural network. The method may begin from block S101 to block S104.

At block S101, a first set of convolution kernels is applied on an input grayscale image to perform at least one convolution operation, thereby generating a set of basic feature maps.

At block S102, a second set of convolution kernels whose size is smaller than that of the first set of convolution kernels, is applied on the set of basic feature maps and thereby generating more than one set of intermediate feature maps. The more than one set of intermediate feature maps are concatenated to form a concatenated layer.

At block S103, at least one convolution operation is performed on the concatenated layer thereby generating a set of deep feature maps.

At block S104, a bounding box classification and a bounding box regression are determined, based on the more than one set of intermediate feature maps or the set of deep feature maps.

These blocks and operations can be performed based on the convolutional neural network, specifically can be performed based on the above face detection device 13. Therefore, details are not repeated again.

The face detection device 13, the face detection method and the face unlock system 10 are lightweight to be easily deployed on a mobile terminal device, and have improved accuracy for face detection.

Specific examples are used in this article to illustrate the principle and implementation of the disclosure, and the description of the above examples is only used to help understand the disclosure. Meanwhile, for those skilled in the art, according to the spirit of the application, there will be changes in the specific implementation and the scope of disclosure. In summary, the content of this specification should not be construed as a limitation to the disclosure.

What is claimed is:

1. A face detection device based on a convolutional neural network, comprising:
    a feature extractor assembly, comprising:
        a first feature extractor, configured to apply a first set of convolution kernels on an input grayscale image thereby generate a set of basic feature maps;
        a second feature extractor, configured to apply a second set of convolution kernels each of which a size is smaller than that of each of the first set of convolution kernels, on the set of basic feature maps and thereby generate more than one set of intermediate feature maps, the more than one set of intermediate feature maps being concatenated thereby forming a concatenated layer; and
        a third feature extractor, configured to perform at least one convolution operation on the concatenated layer; and
    a detector assembly, comprising at least one detector each of which input is derived from one of the second feature extractor and the third feature extractor;
    wherein the third feature extractor comprises at least two convolution operations;
    wherein the at least one detector comprises a first detector, a second detector and a third detector, an input of the first detector is derived from the second feature extractor, the first detector is configured to output a first detection result, an input of the second detector is derived from one of the at least two convolution operations of the third feature extractor, the second detector is configured to output a second detection result, an input of the third detector is derived from another of the at least two convolution operations of the third feature extractor and the third detector is configured to output a third detection result; and
    wherein in response to an area ratio of a human face to an entire input grayscale image being in a first range, the first detector is determined as the most accurate detector and the detection result thereof is outputted; in response to the area ratio of the human face to the entire input grayscale image being in a second range, the second detector is determined as the most accurate detector and the detection result thereof is outputted; in response to the area ratio of the human face to the entire input grayscale image being in a third range, the third detector is determined as the most accurate detector and the detection result thereof is outputted.

2. The device of claim 1, wherein the first set of convolution kernels comprise a first type convolution kernel and a second type convolution kernel, the first type convolution kernel has a size of N×N, and the second type convolution kernel has a size of P×P, N is greater than P.

3. The device of claim 2, wherein P is an integer greater than or equal to 5.

4. The device of claim 1, wherein the first feature extractor is configured to perform at least one convolution operation and at least one pooling operation.

5. The device of claim 1, wherein the first feature extractor is configured to sequentially perform a first operation, a second operation, a third operation and a fourth operation in that order, the first operation and the third operation are convolution operations, and the second and the fourth operation are pooling operations.

6. The device of claim 1, wherein a down-sampled stride of the first feature extractor is greater than or equal to 32.

7. The device of claim 2, wherein the second set of convolution kernels comprise a third type convolution kernel and a fourth type convolution kernel, the third type convolution kernel has a size of C×C, the fourth type convolution kernel has a size of 1×1, C is greater than 1 and smaller than P.

8. The device of claim 1, wherein the second feature extractor comprises more than one processing paths and a concatenating operation, the processing paths are configured to apply various sized convolution kernels on the set of basic feature maps thereby generate various scaled sets of feature maps, and the concatenating operation is configured to concatenate the various scaled sets of feature maps and generate the concatenated layer.

9. The device of claim 8, wherein the processing paths each comprise a 1×1 convolution operation.

10. The device of claim 1, wherein the convolutional neural network is configured to automatically determine which one of the at least one detector is the most accurate detector after training, and the detector assembly is configured to output the detection result of the most accurate detector.

11. The device of claim 1, wherein the first range is greater than the second range, and the second range is greater than the third range.

12. A face detection method based on a convolutional neural network, comprising:
    applying a first set of convolution kernels on an input grayscale image thereby generating a set of basic feature maps;
    applying a second set of convolution kernels each of which a size is smaller than that of each of the first set of convolution kernels, on the set of basic feature maps and thereby generating more than one set of intermediate feature maps, the more than one set of intermediate feature maps being concatenated thereby forming a concatenated layer;
    performing at least two convolution operations on the concatenated layer thereby generating a set of deep feature maps; and
    determining, by at least one detector, a bounding box classification and a bounding box regression, based on the concatenated layer or the set of deep feature maps;
    wherein the at least one detector comprises a first detector, a second detector and a third detector, an input of the first detector is derived from the concatenated layer, an input of the second detector is derived from one of the at least two convolution operations performed on the concatenated layer, and an input of the third detector is derived from another of the at least two convolution operations performed on the concatenated layer; and
    wherein the determining, by at least one detector, a bounding box classification and a bounding box regression, based on the concatenated layer or the set of deep feature maps, comprises:

in response to an area ratio of a human face to an entire input grayscale image being in a first range, determining the first detector as the most accurate detector, and outputting a first detection result from the first feature detector as the bounding box classification and the bounding box regression;

in response to the area ratio of the human face to the entire input grayscale image being in a second range, determining the second detector as the most accurate detector, and outputting a second detection result from the second feature detector as the bounding box classification and the bounding box regression;

in response to the area ratio of the human face to the entire input grayscale image being in a third range, determining the third detector as the most accurate detector, and outputting a third detection result from the third feature detector as the bounding box classification and the bounding box regression.

13. The face detection method of claim 12, wherein the first range is greater than the second range, and the second range is greater than the third range.

14. A face unlock system, comprising:

an IR camera, configured to capture an image;

an image decoding device, configured to decode the captured image to form a grayscale image;

a face detection device, wherein the face detection device is based on a convolutional neural network, and comprises:

a feature extractor assembly, comprising:

a first feature extractor, configured to apply a first set of convolution kernels on an input grayscale image thereby generate a set of basic feature maps;

a second feature extractor, configured to apply a second set of convolution kernels each of which a size is smaller than that of each of the first set of convolution kernels, on the set of basic feature maps and thereby generate more than one set of intermediate feature maps, the more than one set of intermediate feature maps being concatenated thereby forming a concatenated layer; and a third feature extractor, configured to perform at least one convolution operation on the concatenated layer; and a detector assembly, comprising at least one detector each of which input is derived from one of the second feature extractor and the third feature extractor, and configured to output a bounding box classification result and a bounding box regression result;

wherein the third feature extractor comprises at least two convolution operations; wherein the at least one detector comprises a first detector, a second detector and a third detector, an input of the first detector is derived from the second feature extractor, the first detector is configured to output a first detection result, an input of the second detector is derived from one of the at least two convolution operations of the third feature extractor, the second detector is configured to output a second detection result, an input of the third detector is derived from another of the at least two convolution operations of the third feature extractor and the third detector is configured to output a third detection result; and wherein in response to an area ratio of a human face to an entire input grayscale image being in a first range, the first detector is determined as the most accurate detector and the detection result thereof is outputted; in response to the area ratio of the human face to the entire input grayscale image being in a second range, the second detector is determined as the most accurate detector and the detection result thereof is outputted; in response to the area ratio of the human face to the entire input grayscale image being in a third range, the third detector is determined as the most accurate detector and the detection result thereof is outputted; and a face verification device, configured to determine whether the grayscale image corresponds to an authorized person for unlocking, based on the bounding box classification result and the bounding box regression result.

15. The system of claim 14, wherein the face verification device is configured to:

acquire a sample face image of the authorized person, generate a verification pair including a face predicted by the face detection device and a sample face in the sample face image, and determine whether the verification pair is a positive pair, wherein the positive pair corresponds to an unlocking instruction.

16. The system of claim 15, wherein the face verification device is configured to:

determine the verification pair as the positive pair in response to the face predicted by the face detection device and the sample face in the sample face image belong to a same authorized person.

17. The face unlock system of claim 14, wherein the first set of convolution kernels comprise a first type convolution kernel and a second type convolution kernel, the first type convolution kernel has a size of N×N, and the second type convolution kernel has a size of P×P, N is greater than P, and P is an integer greater than or equal to 5; and wherein the second set of convolution kernels comprise a third type convolution kernel and a fourth type convolution kernel, the third type convolution kernel has a size of C×C, the fourth type convolution kernel has a size of 1×1, C is greater than 1 and smaller than P.

18. The face unlock system of claim 14, wherein the first feature extractor is configured to sequentially perform a first operation, a second operation, a third operation and a fourth operation in that order, the first operation and the third operation are convolution operations, and the second and the fourth operation are pooling operations.

19. The face unlock system of claim 14, wherein the second feature extractor comprises more than one processing paths and a concatenating operation, the processing paths are configured to apply various sized convolution kernels on the set of basic feature maps thereby generate various scaled sets of feature maps, and the concatenating operation is configured to concatenate the various scaled sets of feature maps and generate the concatenated layer, wherein the processing paths each comprise a 1×1 convolution operation.

20. The face unlock system of claim 14, wherein the first range is greater than the second range, and the second range is greater than the third range.

* * * * *